United States Patent
Lei

(12) 
(10) Patent No.: US 6,301,043 B1
(45) Date of Patent: *Oct. 9, 2001

(54) ENDOSCOPE WITH AT LEAST ONE REVERSAL SYSTEM WITH A NON-HOMOGENEOUS REFRACTION INDEX

(75) Inventor: Fang Lei, Durchhausen (DE)

(73) Assignee: Karl Storz GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,354

(22) PCT Filed: Jul. 28, 1997

(86) PCT No.: PCT/DE97/01592

§ 371 Date: Dec. 31, 1998

§ 102(e) Date: Dec. 31, 1998

(87) PCT Pub. No.: WO98/04949

PCT Pub. Date: Feb. 5, 1998

(30) Foreign Application Priority Data

Jul. 28, 1996 (DE) .............................. 196 30 368
Jul. 7, 1997 (DE) .............................. 197 29 002

(51) Int. Cl.[7] ........................................ G02B 1/00
(52) U.S. Cl. ........................ 359/435; 359/654; 600/172
(58) Field of Search ............................ 359/434, 435, 359/653, 654; 600/101, 160, 172

(56) References Cited

U.S. PATENT DOCUMENTS

| 5,341,240 | * | 8/1994 | Broome | 359/435 |
| 5,457,576 | * | 10/1995 | Atkinson et al. | 359/654 |
| 5,568,312 | * | 10/1996 | Horton | 359/435 |
| 5,684,629 | * | 11/1997 | Leiner | 359/435 |
| 5,805,345 | * | 9/1998 | Nagaoka | 359/654 |
| 5,933,275 | * | 8/1999 | Igarashi | 359/435 |

* cited by examiner

Primary Examiner—Cassandra Spyrou
Assistant Examiner—Mark A. Robinson
(74) Attorney, Agent, or Firm—St. Onge Steward Johnston & Reens LLC

(57) ABSTRACT

An endoscope having a distally disposed lens and an optical transmission system which transmits the image of the lens to the proximal end of the endoscope is provided. The transmission system includes at least one reversing system, which includes two elements in mutual mirror-inverted arrangement. Each element includes a rod lens with planar faces and at least one optically thin lens having a planar surface. The rod lenses consist of an inhomogeneous material having a positive dispersion and an inhomogeneous refractive index in the radial direction, while the thin lenses are plano-convex lenses.

15 Claims, 4 Drawing Sheets

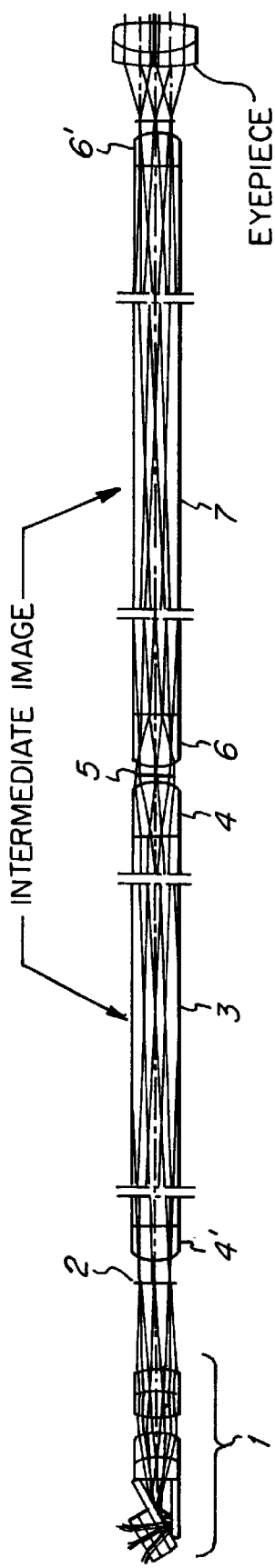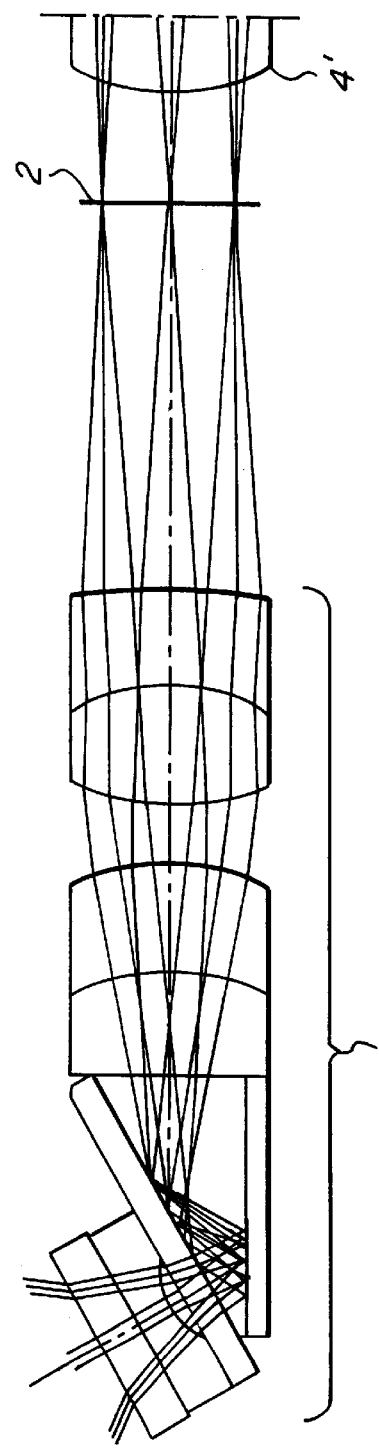
FIG. 4a
FIG. 4b

ENDOSCOPE WITH AT LEAST ONE REVERSAL SYSTEM WITH A NON-HOMOGENEOUS REFRACTION INDEX

FIELD OF THE INVENTION

The present invention relates to an endoscope in accordance with the introductory clause of Patent claim 1.

PRIOR ART

An endoscope of the claimed general type is known from the U.S. Pat. No. 4,783,154. That known endoscope comprises a distally disposed lens and an optical transmission system which transmits the image of the lens disposed on the distal end to the proximal end, i.e. to that end of the endoscope which is located outside the cavity. The transmission system includes at least one reversing system consisting of two symmetrical elements whereof each is formed by a optically thin piano-concave lens. The rod lenses, which may include, inter alia, plane faces, consist of a material having a varying or inhomogeneous refractive index.

For an explanation of all the aspects not described here in more details explicit reference is made, by the way, to the U.S. Pat. No. 4,783,154 and the prior art documents listed on the cover sheet of that patent document.

For the purposes of the present application the term "reversing system"—which is also referred to as relay lens system—is to be understood to denote an optical system which produces (at least) one 1:1 image. In endoscopes, as a rule, several reversing systems—preferably in an odd number—are combined to form one transmission system with a number of image reversals in correspondence with the number of image reversals.

In known endoscopes with lenses exclusively consisting of a homogeneous material the two elements of each reversing system are frequently composed of more than two elements.

In the endoscope of the claimed general type, as it is known from the U.S. Pat. No. 4,783,154, the principal focal point is exclusively the substitution of several lens elements of conventional endoscopes by at least one lens element having an inhomogeneous refractive index, rather than the improvement of the compared against known endoscopes.

From the article "Correction of chromatic aberrations in GRIN endoscopes" by Dennis C. Leiner and Rochelle Prescott, published in APPLIED OPTICS, vol. 22, No. 3, from page 383 onwards, it is moreover known to reduce chromatic image aberrations by the application of lenses consisting of a material having an inhomogeneous, i.e. varying, refractive index.

In endoscopes of the type used in medicine or in engineering for the observation of cavities such as body cavities, combustion chambers in etc., it is not the correction of chromatic aberrations which is the predominant focal point but rather the following problem:

Depending on the specific application, endoscopes of different length must be used. In order to be able to "standardise" the structure of the endoscopes it is generally common to provide endoscopes of different lengths with a different number (1, 3, 5, . . . ) of reversing systems, with the reversing systems always being identically configured, independently of the length of the endoscope.

The reversing systems which have so far actually been employed present a defined field curvature or camber. The cumulated field curvature of the transmission system is hence dependent on the number of the employed reversing systems. In the known endoscopes which are presently commercially available the field curvature of the transmission system, i.e. the "added or cumulated field curvatures" of the reversing system, are "compensated" by an opposite field curvature of the respective lens. This means that the endoscope manufacturers must use and hence keep stocks of different lenses for endoscopes of "different lengths" in order to be able to produce, at short notice, endoscopes have a length and hence a different number of reversing systems in correspondence with the respective application as ordered.

Another cost factor which is anything but negligible results from the calculation of a plurality of lenses which are, actually speaking, equal—e.g. in terms of the angle of view and/or the image angle—which are distinguished from each other only in view of their field curvature, so that they are usable with a different number of reversing systems.

These stock-keeping and calculation problems could be avoided if each reversing system and hence the transmission system, too, had no or only a negligibly small field curvature. Then the same lens could constantly be used independently of the length of the endoscope.

In technical literature and particularly patent literature various proposals have been disclosed for reversing systems for endoscopes having no or a negligibly small field curvature. The known proposals present, however, the disadvantage that they require a comparatively great number of lenses for each reversing system so that the production costs are too high for commercial applications in engineering or medicine.

BRIEF DESCRIPTION OF THE INVENTION

The present invention is based on the problem of providing an endoscope including an optical transmission system consisting of reversing or relay lens systems having a simple design and a field curvature so small that a compensation of the field curvature or camber of the transmission system by the distally disposed lens is not required even with a strongly different number of reversing or relay lens systems, so that the same lens can always be used independently of the number of the reversing or relay lens systems.

One inventive solution to this problem is defined in Patent claim 1. Improvements of the invention are the subject matters of claims 2 et seq.

In accordance with the invention it has been found that the defined problem may be solved in a way that, starting out from an endoscope in accordance with the introductory clause of Patent claim 1, this endoscope is improved by the provision that the rod lenses consist of a material having a positive dispersion and a radially inhomogeneous refractive index. Moreover, the optically thin lenses are plano-convex lenses.

The refractive index which varies along the radial direction (i.e. orthogonally on the optical axis) decreases as a function of the radius in radial symmetry as the distance from the optical axis increases. Moreover, on account of the positive dispersion the refractive index decreases as the wavelength increases.

The invention starts out from the following fundamental consideration:

A conventional reversing system with a locally non-varying refractive index, which comprises two elements symmetrical relative to the aperture, whereof each includes a rod lens—as has been proposed, for instance, by Hopkins and as it is presently produced by a number of manufacturers—presents a strong field curvature and hence a substantial astigmatism. These aberrations must be compensated by a complex lens design.

On the other hand, reversing systems with rod lenses or rods having an inhomogeneous refractive index (GRIN rods) present chromatic aberrations which must equally be compensated by the lens.

The advantages of the known reversing systems are avoided in accordance with the invention by the provision that a GRIN rod is used instead of a rod lens with a conventional design, which rod displays a positive dispersion and hence an over-corrected longitudinal chromatic aberration. Due to the inhomogeneity of the refractive index it is now possible to achieve the desired optical effect with planar faces and to compensate yet the astigmatism and the field curvature practically completely. The thin planoconvex lens, which presents an under-corrected longitudinal chromatic aberration, serves substantially to correct the longitudinal chromatic aberration of the GRIN rod.

With the inventive configuration of the reversing or relay lens systems it is hence possible to correct not only the chromatic aberrations of transmission systems in endoscopes but to keep also the field curvature or camber of each reversing system so small that different lenses are not required even with a strongly differing number of reversing systems and thus over a wide range of varying endoscope lengths: in practical operation the same lens may be used with 1 to 15 reversing or relay lens systems, on account of the inventive configuration of the reversing systems for endoscopes, without any occurrence of unacceptable aberrations and particularly field curvatures.

As all image aberrations are corrected in the reversing system a modular reversing system is achieved which may be combined in practically any number to form one transmission system!

Explicit reference should be made to the following aspect: In practical operation normally an odd number of reversals is applied as an odd number of reversals, in combination with the reversal through the eyepiece, furnishes an upright image. It is, however, also possible as a matter of fact to operate on an even number instead of an odd number of reversals and to erect the inverted image optically—e.g. through a prism—or electronically—when an electronic pick-up means is used!

Improvements of the invention are the subject matters of the Claims 2 et seq.

In accordance with Claim 2 the planar surface of the respective thin lens faces the rod lens of the same element. This simplifies the design of the individual reversing systems considerably, particularly when the rod lens and the lens (es) of each element are cemented to each other. But even when the lenses are not cemented the assembly is simplified by spacers which are of a simpler design—due to the opposing planar surfaces.

The inventive structure presents the further advantage that it is not necessary that the thin lens(es) consist(s) equally of a material having an inhomogeneous refractive index. Hence, in accordance with Claim 4, the thin plano-convex lens may have a comparatively simple structure and consist of a material having a homogeneous refractive index.

Claim 5 defines a condition for the radius or curvature r of the curved surface of the piano-convex lens having an axial thickness d. In correspondence with the found inventive inequation the following relationship applies:

$$0.9 \cdot \frac{(n_l - 1) \cdot v_l}{1 - n_l \cdot v_l \cdot \Delta n_{gl}} \cdot \left( \frac{n_l}{n_g} \cdot \Delta L_{CF} - \Delta n_{gl} \cdot d \right) \leq$$

$$r \leq 13 \cdot \frac{(n_l - 1) \cdot v_l}{1 - n_l \cdot v_l \cdot \Delta n_{gl}} \cdot \left( \frac{n_l}{n_g} \cdot \Delta L_{CF} - \Delta n_{gl} \cdot d \right)$$

$$\text{with } \Delta n_{gl} = \frac{n_g - 1}{n_g \cdot v_g} - \frac{n_l - 1}{n_l \cdot v_l}$$

wherein:
- $n_g$ refractive index of the inhomogeneous material on the optical axis
- $v_g$ Abbe coefficient of the inhomogeneous material on the optical axis
- $n_l$ refractive index of the material of the thin lens
- $v_l$ Abbe coefficient of the material of the thin lens
- $\Delta L_{CF}$ the axial chromatic aberration of the inhomogeneous material.

The correction of the chromatic aberration with a simultaneous flattening of the field is further improved when, in correspondence with Claim 6, the following relationship is applied for the amounts of the focal length $f_g$ of the rod lens made of a material having an inhomogeneous refractive index and the focal length $f_l$ of the thin lens:

$$|f_g/f_l| > 0.1$$

Claim 7 defines that the refractive index of the inhomogeneous rod lens material decreases from the optical axis in an outward direction, i.e. as the space from the optical axis decreases. The function of the decrease may have a course which is approximately parabolic. Such a course can be achieved, for instance, when glass rods of a suitable basic material are immersed into an ion exchange bath. The ion exchange results in the desired variation of the refractive index in the radial direction, i.e. orthogonal on the circumferential surface of the glass rods. It is, of course, also possible to use rods made of a synthetic material instead of glass rods.

Claims 9 and 10 specify material data for a commercially available material having an inhomogeneous refractive index, which is particularly expedient for the realisation of the invention:

In accordance with Claim 9, the refractive index has a value of 1.5359 on the optical axis for the wave length λ=587.6 nm, which has decreased by $2.8 \cdot 10^{-3}$ at a spacing by $|r|=1.35$ mm from the optical axis. Such a variation of the refractive index can be realised with common methods for the achievement of a varying refractive index and is particularly well suitable for endoscopes having a diameter in the range of roughly 1.5 to more than 8 mm, preferably 4 mm. The given data is, of course, to be understood only in an exemplary way.

claim 10 specifies a preferred possibility of the specifically parabolic dependence of the refractive index on the wavelength, according to which applies:

n(λ=486.1 nm)=1.5430 n(λ=587.6 nm)=1.5359 n(λ=656.3 nm)=1.5329

In the embodiment characterised in Claim 11 a planoconvex lens is provided on either side of the rod lens with planar surfaces, which may consist of a material having a homogeneous or inhomogeneous refractive index.

In a reversing system with a single image reversal only this could even further reduce the aberrations, specifically the field curvature or camber, respectively.

In particular it is possible, however, to define reversing systems consisting of two symmetrical elements, which provide for at least three image reversals so that an intermediate image is present in the rod lens of each element (Claim 14).

In another preferred embodiment of the invention each element comprises a rod lens made of a material having an inhomogeneous refractive index and two plano-convex lenses having a homogeneous refractive index, with three image reversals being performed in each reversing system.

The inventive system thus presents the advantage that only six elements are sufficient to permit three image reversals.

The embodiment defined in Claim 12 presents the additional advantage that with further improved optical properties the structure and hence the assembly of an inventive endoscope are further simplified by the provision that at least one of the two piano-convex lenses—and in accordance with Claim 13 preferably both lenses—) are cemented to the rod lens.

It is thus possible in any case that the distally disposed lens is so designed that it presents practically no field curvature or camber, respectively, so that one and the same lens may be used independently of the number of the respectively required reversals.

BRIEF DESCRIPTION OF THE DRAWING

The invention will be described in the following in more details without any restriction of the general inventive idea by the example of embodiments with reference to the drawing to which in all other respects explicit reference is made as far as the disclosure of inventive details is concerned which are not explained in all details in the text; in the drawing:

FIG. 2b shows the 0° lens used in the embodiment according to FIG. 2a;

FIG. 3b illustrates the 30° lens used in the embodiment according to FIG. 3a;

FIG. 4a shows the second embodiment with a 70° lens, and

FIG. 4b is an illustration of the 70° lens used in the embodiment according to FIG. 4a.

DESCRIPTION OF PREFERRED EMBODIMENTS

Figure 1:
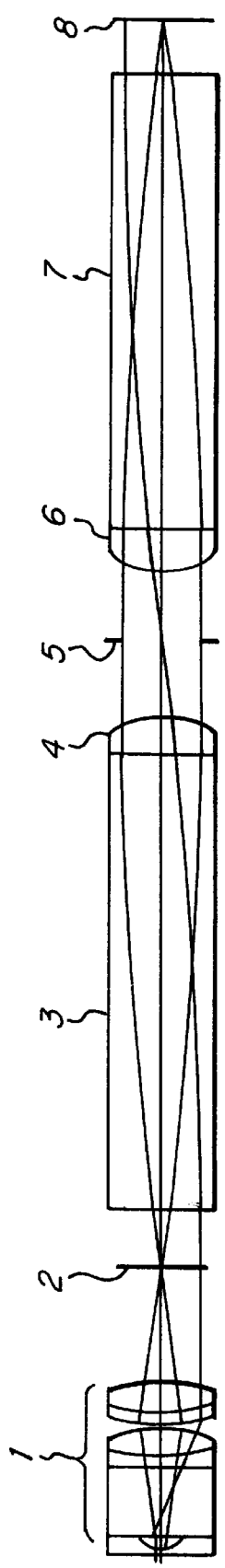
FIG. 1 is a sectional lens view taken through a first embodiment of the invention.

For the embodiments illustrated in the figures the reference numeral 1 denotes globally a lens which is disposed on the distal end of an endoscope which is not shown in details, and which forms the image of a scene, which is not shown here, in an image plane 2.

The lens 1 may have a specific viewing direction in a manner known per se—which is not to be confused with the image angle—which may typically amount to 0°; 30°, 70° and more.

The image plane 2 of the lens 1 is projected up to the proximal end of the endoscope by a plurality of relay lens or reversing systems which will be described in the following in more details and whereof each performs at least one 1:1 imaging operation.

In the embodiments illustrated in the figures merely one reversing system is shown. As has been set out above already it is possible in accordance with the invention to "join in succession" almost any number of reversing systems on account of the extremely slight field curvature.

In the embodiment shown in FIG. 1 the reversing system consists of the lens elements 3, 4, 6, and 7. The reversing system projects the plane 2 into the (further) image plane 8. The reference numeral 5 denotes the aperture of the (illustrated) reversing system.

In the embodiment shown in FIG. 1 each reversing system consists of three elements which are symmetrical relative to the aperture 5. Each element includes a rod 3 or 7, respectively, with planar faces, which is made of a material having an inhomogeneous refractive index; in particular, the refractive index undergoes a decrease, starting out from the optical axis along a radial orientation, i.e. orthogonal on the optical axis, with the variation function being rotationally symmetrical.

A plano-convex lens 4 or 6, respectively, is cemented to the face of the rods 3 or 7, respectively, which faces the aperture 5, this lens 4 or 6 being "optically thin".

As has been set out above, each of the two rods 3 or 7 consists of a material having an inhomogeneous refractive index whereas the lenses 4 or 6 consist of a material having a homogeneous refractive index.

The following Tables 1 to 3 list numerical data of three numerical variants of the first embodiment:

TABLE 1

| area no. 1 | radius | spacing | refractive index n | Abbe coefficient v |
|---|---|---|---|---|
| 1 | planar | 27.54 | 1.5359* | 53.06 |
| 2 | planar | 1 | 1.62 | 36.35 |
| 3 | −52.31 | 0.84 | air | |
| 4 | 52.31 | 1 | 1.62 | 36.35 |
| 5 | planar | 27.54 | 1.5359* | 53.06 |
| 6 | planar | | | |

TABLE 2

| area no. 1 | radius | spacing | refractive index n | Abbe coefficient v |
|---|---|---|---|---|
| 1 | planar | 26.22 | 1.5359* | 53.06 |
| 2 | planar | 1 | 1.6405 | 60.08 |
| 3 | −38.91 | 4.8 | air | |
| 4 | 38.91 | 1 | 1.6406 | 60.08 |
| 5 | planar | 26.22 | 1.5359* | 53.06 |
| 6 | planar | | | |

TABLE 3

| area no. 1 | radius | spacing | refractive index n | Abbe coefficient v |
|---|---|---|---|---|
| 1 | planar | 28.84 | 1.5359* | 53.06 |
| 2 | planar | 2.5 | 1.7847 | 26.07 |
| 3 | −106.54 | 0.66 | air | |
| 4 | 106.54 | 2.5 | 1.7847 | 26.07 |
| 5 | planar | 28.84 | 1.5359* | 53.06 |
| 6 | planar | | | |

The area numbers i are counted in succession from that face of the rod 3 which faces the plane 2 (number 1) to that face of the rod 7 which faces the plane 8 (number 6). Cemented areas are listed only once as usual. The spacing indicated in the line of an area number i is the lens thickness or the so-called air gap between the apexes of the areas i and (i+1) which are located on the optical axis. The refractive index n and the Abbe coefficient v are correspondingly the material data of the material between the areas i and (i and 1). These specifications apply by way of analogy also for the following embodiments.

The radii of the areas and the spacings or thicknesses are indicated in millimetres. The refractive indices n and the Abbe coefficients are respectively specified for the wavelength λ=587.6 nm.

The following Table 4 compares the optical properties, i.e. the lateral spherical aberration $δ_y$, the chromatic aberration and the sagittal (S) and tangential (T) field curvature of the three variants numerically indicated for the first embodiment in the foregoing, with a conventional reversing system of a homogeneous material as it is employed in a commercially available system. Moreover, the corresponding data is specified for a rod 3 or 7, respectively, of inhomogeneous material:

TABLE 4

|  | spherical aberration $δ_y$ | chromatic aberration | sagittal field curvature S | tangential field curvature T |
|---|---|---|---|---|
| conventional system | 0.00007 | 0.00001 | −0.081 | −0.137 |
| inhomogeneous rod | 0.00027 | −0.00032 | −0.0039 | 0.0072 |
| 1st embodiment | 0.00017 | 0 | −0.0048 | 0.0023 |
| 2nd embodiment | 0.00035 | −0.00006 | −0.0076 | 0.0014 |
| 3rd embodiment | 0.00036 | 0.00004 | −0.006 | 0.006 |

The foregoing Table 4, which shows the various aberrations, shows that, compared against conventional systems presently employed in endoscopes—the inventive systems present a field camber reduced by up to 2 orders both in the tangential and sagittal direction, at a slightly greater lateral spherical aberration, which is, however, negligibly small in practice, and a slightly greater chromatic aberration, which may equally be neglected in practice. The field curvature is reduced as largely as possible specifically in the tangential direction; this is decisive for the improvement of the image quality, compared against prior art.

In the second embodiment of the invention a respective plano-convex lens 4, 4' or 6, 6' is cemented on both faces of the rods 3 or 7, respectively, which are "optically thin".

Figure 2A:
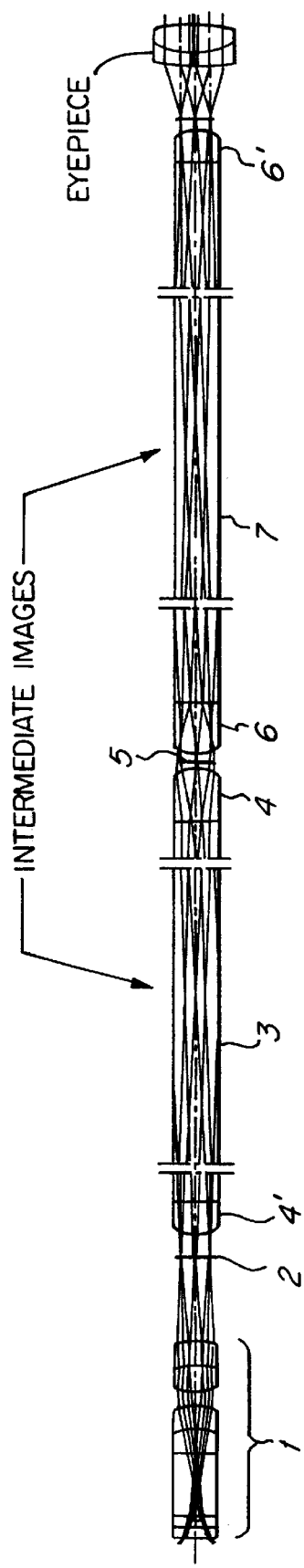
FIG. 2a is a sectional lens view taken through a second embodiment of the invention with a 0° lens.
Figure 2B:
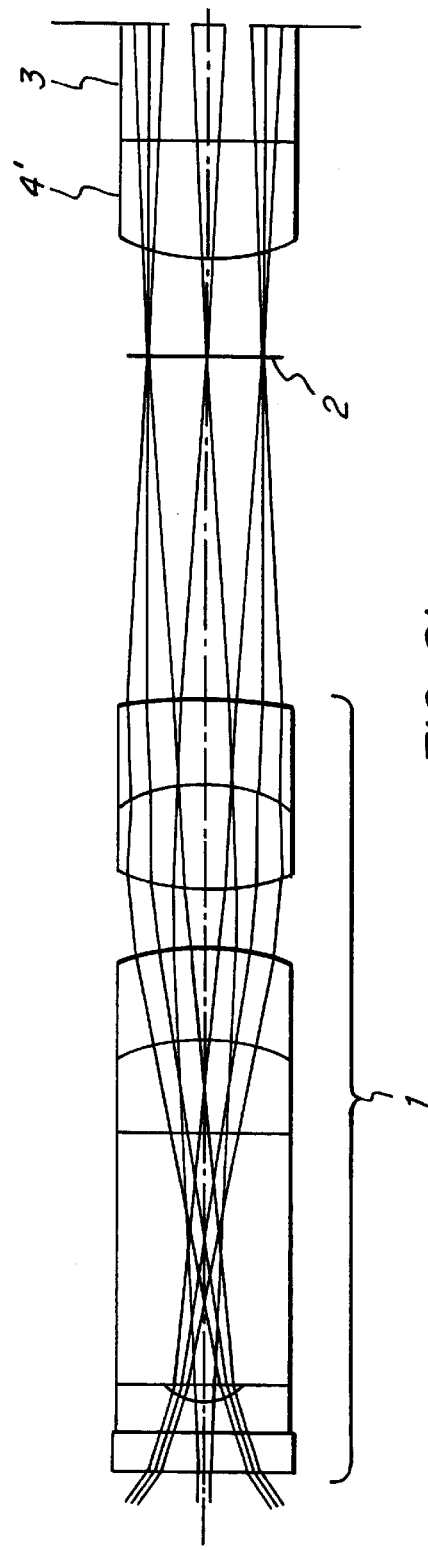

FIG. 2a shows the overall structure whilst FIG. 2b illustrates the structure of the 0° lens.

Either rod 3 or 7 consists of a material having an inhomogeneous refractive index whilst the lenses 4, 4' or 6, 6' consist of a material having a homogeneous refractive index.

Figure 3A:
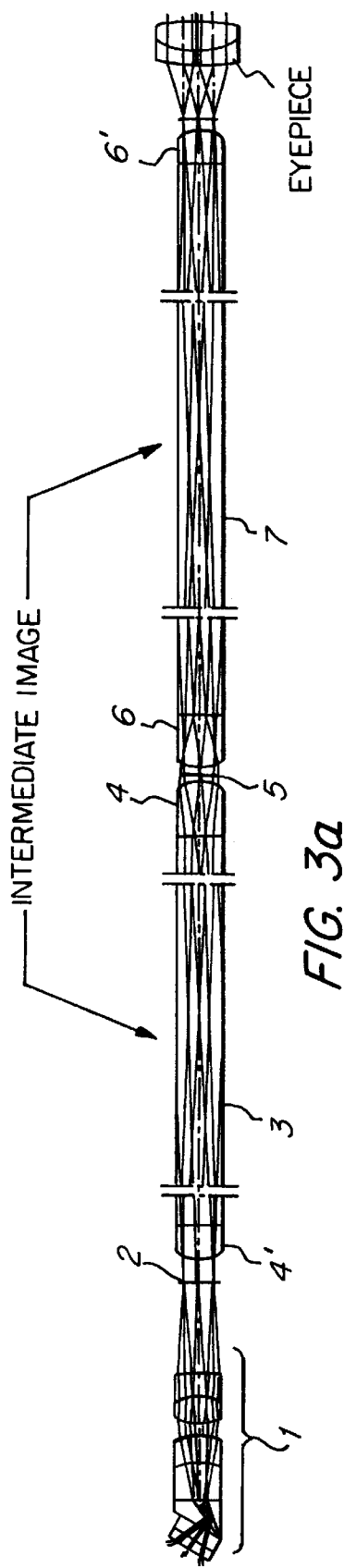
FIG. 3a shows the second embodiment with a 300° lens.
Figure 3B:
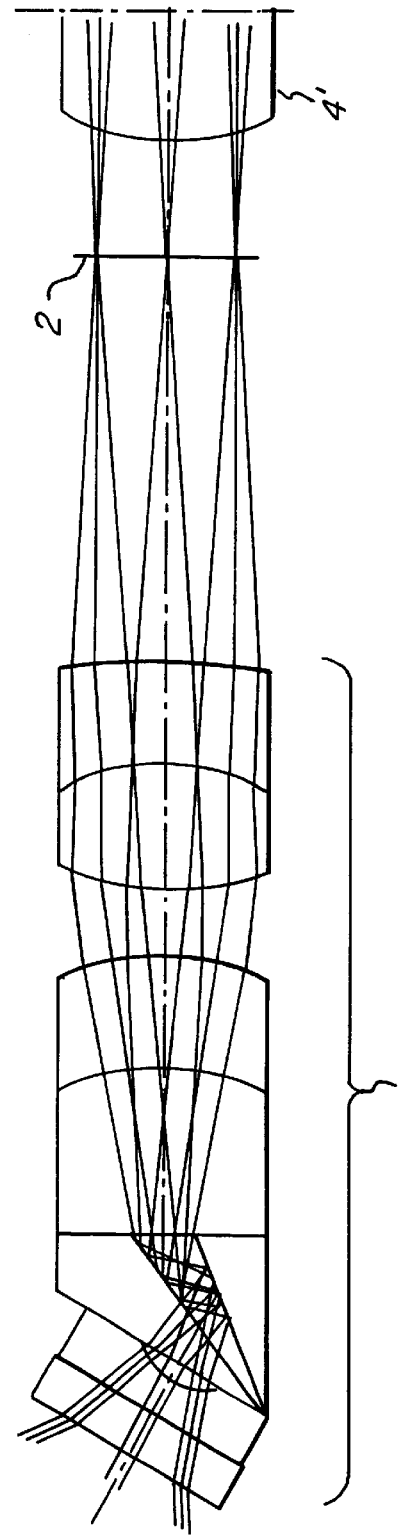

FIGS. 3a and 4a are view of the overall structure in which a 30° and a 70° lens is used whilst FIGS. 3b and 4b show the structure of the respective lenses.

The following Table 5 reflects the numerical data of the reversing system in accordance with the second embodiment which provides for three image reversals:

TABLE 5

| area no. 1 | radius | spacing | refractive index n | Abbe coefficient v |
|---|---|---|---|---|
| 1 | 30 | 1.7 | 1.52 | 64.2 |
| 2 | planar | 84.3 | 1.5359* | 53.06 |
| 3 | planar | 11.4 | 1.62 | 36.4 |
| 4 | −19.0 | 1 | air |  |
| 5 | 19.0 | 11.4 | 1.62 | 36.4 |

TABLE 5-continued

| area no. 1 | radius | spacing | refractive index n | Abbe coefficient v |
|---|---|---|---|---|
| 6 | planar | 84.3 | 1.5359* | 53.06 |
| 7 | planar | 1.7 | 1.52 | 64.2 |
| 8 | −30 |  |  |  |

Like in the previous embodiments, "*" denotes the materials having an inhomogeneous refractive index.

As has been set out in the foregoing, the lens 1 need not present a tangential and sagittal (lateral) field curvature—which is specified for a certain number of reversing systems—in distinction from the known lenses in endoscopes.

The Table 6 below reflects the numerical data of such a lens s it is illustrated in FIG. 2b and appropriate for universal application:

TABLE 6

| area no. 1 | radius | spacing | refractive index n | Abbe coefficient v |
|---|---|---|---|---|
| 1 | planar | 0.5 | 1.8 | 46.4 |
| 2 | 1.0 | 0.2 | air |  |
| 3 | planar | 3.8 | 1.6 | 35.7 |
| 4 | planar | 1.4 | 1.7 | 50.4 |
| 5 | −3.1 | 1.4 | 1.6 | 60.3 |
| 6 | −3.5 | 0.9 | air |  |
| 7 | 3.7 | 1.6 | 1.5 | 64.2 |
| 8 | −2.6 | 1.3 | 1.8 | 26.1 |
| 9 | −7.5 |  |  |  |

The lens has a focal length f of 1.6 mm and a field angle (image angle) of 2ω=70°. The field camber is very small. In the event of other viewing directions a prism array having the same optical path length must be used instead of the plate with parallel faces. Examples of such an arrangement are illustrated in FIGS. 3b and 4b; for this reason the specification of numerical data may be dispensed with.

In conclusion a modular structure of endoscopes having different lengths with a correspondingly different number of reversing systems is hence possible in any case, using a single type of reversing system and a single lens type (for any viewing direction). Apart therefrom, the calculation of the lens is simplified.

What is claimed is:
1. Endoscope having a distal end and a proximal end, said endoscope comprising
    a distally disposed objective lens which forms an image of an object to be viewed; and
    an optical transmission system which transmits said image to said proximal end, and which includes at least one reversing system comprising two elements in mutual mirror-inverted arrangement, each element comprising a first lens and at least one second lens;
    wherein
        said objective lens is structured to form said image with substantially no field curvature;
        said first lens is a rod lens with planar faces and consists of an inhomogeneous material having a refractive index which varies along the radial direction of said rod lens, said rod lens producing a longitudinal chromatic aberration; and
        said at least one second lens is a thin plano-convex lens which corrects said longitudinal chromatic aberration produced by said rod lens.
2. Endoscope according to claim 1, characterized in that a planar face of said at least one optically thin lens is facing the rod lens of the same element.

3. Endoscope according to claim 2, characterized in that said rod lens and said at least one optically thin lens of each element are cemented.

4. Endoscope according to claim 1, characterized in that said at least one optically thin lens consists of a material having a homogenous refractive index.

5. Endoscope according claim 1, characterized in that the following relationship applies to the radius of curvature r of the curved surface of said plano-convex lens having an axial thickness d:

$$0.9 \cdot \frac{(n_1-1) \cdot v_1}{1 - n_1 \cdot v_1 \cdot \Delta n_{gl}} \cdot \left(\frac{n_1}{n_g} \cdot \Delta L_{CF} - \Delta n_{gl} \cdot d\right) \le$$

$$r \le 13 \cdot \frac{(n_1-1) \cdot v_1}{1 - n_1 \cdot v_1 \cdot \Delta n_{gl}} \cdot \left(\frac{n_1}{n_g} \cdot \Delta L_{CF} - \Delta n_{gl} \cdot d\right)$$

with $\Delta n_{gl} \equiv \frac{n_g - 1}{n_g \cdot v_g} - \frac{n_1 - 1}{n_1 \cdot v_1}$ wherein:

$n_g$=refractive index of the inhomogeneous material on the optical axis $v_g$=Abbe coefficient of the inhomogeneous material on the optical axis $n_1$=refractive index of the material of the thin lens $v_1$=Abbe coefficient of the material of the thin lens $\Delta L_{CF}$=the axial chromatic aberration of the inhomogeneous material.

6. Endoscope according to claim 5, characterized in that the following applies to the amount of the focal length $f_g$ of said rod lens made of a material having an inhomogeneous refractive index and the focal length $f_1$ of said thin lens:

$$|f_g/f_1| > 0.1$$

7. Endoscope according to claim 1, characterized in that the refractive index of said inhomogenous material decreases from the optical axis in an outward direction.

8. Endoscope according to claim 7, characterized in that the decrease is rotationally symmetrical relative to the optical axis and has an approximately parabolic course as a function of the radius.

9. Endoscope according to claim 8, characterized in that the refractive index of said inhomogeneous material on the optical axis has a value of 1.5359 for the wavelength λ=587.6 nm, which is decreased by 2.810$^{-3}$ at a spacing |r|=1.35 nm from the optical axis.

10. Endoscope according to claim 1, characterized in that the following applies to the dependence of the refractive index on the wavelength:

n(λ=486.1 nm)=1.5430 n(λ=587.6 nm)=1.5359 n(λ=656.3 nm)=1.5329

11. Endoscope according to claim 1, characterized in that a plano-convex lens is provided on either side of the rod lens having planar faces.

12. Endoscope according to claim 11, characterized in that at least one of said two piano-convex lenses is cemented to said rod lens.

13. Endoscope according to claim 12, characterized in that both plano-convex lenses are cemented to said rod lens.

14. Endoscope according to claim 11, characterized in that an intermediate image is present in the rod lens of each element.

15. Endoscope according to claim 1, characterized in that the distally disposed lens is so structured that it provides an image plane having practically no field curvature or camber, respectively.

* * * * *